(12) United States Patent
Watanabe (10) Patent No.: US 8,661,115 B2
(45) Date of Patent: Feb. 25, 2014

(54) INFORMATION COMMUNICATION APPARATUS

(75) Inventor: Tadayuki Watanabe, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 775 days.

(21) Appl. No.: 12/067,785

(22) PCT Filed: Sep. 26, 2006

(86) PCT No.: PCT/JP2006/319066
§ 371 (c)(1),
(2), (4) Date: Mar. 21, 2008

(87) PCT Pub. No.: WO2007/037232
PCT Pub. Date: Apr. 5, 2007

(65) Prior Publication Data
US 2010/0153582 A1    Jun. 17, 2010

(30) Foreign Application Priority Data
Sep. 29, 2005  (JP) .................................. 2005-285203

(51) Int. Cl.
G06F 15/173 (2006.01)
(52) U.S. Cl.
USPC ............... 709/224; 709/225; 709/245; 726/2; 726/17; 726/19; 726/27
(58) Field of Classification Search
USPC ............. 709/224, 225, 245; 726/2, 17, 19, 27
See application file for complete search history.

(56) References Cited

U.S. PATENT DOCUMENTS

| | | | |
|---|---|---|---|
| 6,360,326 B1 * | 3/2002 | Hiles | 726/19 |
| 6,834,372 B1 * | 12/2004 | Becker et al. | 715/234 |
| 7,360,086 B1 * | 4/2008 | Tsuchiya et al. | 713/168 |
| 7,475,425 B2 * | 1/2009 | Bantz et al. | 726/22 |
| 2002/0007453 A1 * | 1/2002 | Nemovicher | 713/155 |
| 2002/0016857 A1 * | 2/2002 | Harari | 709/238 |

(Continued)

FOREIGN PATENT DOCUMENTS

| | | |
|---|---|---|
| JP | 2002207672 A | 7/2002 |
| JP | 2002251375 A | 9/2002 |
| JP | 2004-062771 | 2/2004 |
| JP | 2004362075 A | 12/2004 |

OTHER PUBLICATIONS

Toshikazu Watanabe, "Kojin Joho Hogo & Spyware SPAM Gekitaiho", ASCII, vol. 28, No. 12, 2004, pp. 114-121.

(Continued)

Primary Examiner — Thuong Nguyen
(74) Attorney, Agent, or Firm — DLA Piper LLP (US)

(57) ABSTRACT

An object is to provide an information communication apparatus able to reliably transmit information to an intended site on a network and a program of the same. Before transmitting the information input from a key input portion (102) from a communication portion (101), it is judged based on registered content of an access list (107) whether or not the transmission of this input information is permitted. When this input information matches with the information included in the access list (107), and a URL address connected with the information matching with the input portion in the access list (107) differs from the address of the transmission destination of the input information, a warning screen is displayed in a display portion (105).

7 Claims, 7 Drawing Sheets

(56) References Cited

U.S. PATENT DOCUMENTS

| | | | |
|---|---|---|---|
| 2002/0083098 A1* | 6/2002 | Nakamura | 707/513 |
| 2002/0133724 A1* | 9/2002 | Park | 713/201 |
| 2004/0198456 A1* | 10/2004 | Kelkar | 455/566 |
| 2006/0218247 A1* | 9/2006 | Sauve et al. | 709/219 |
| 2007/0055749 A1* | 3/2007 | Chien | 709/219 |
| 2007/0291741 A1* | 12/2007 | Hwang | 370/352 |
| 2008/0172382 A1* | 7/2008 | Prettejohn | 707/6 |
| 2010/0017865 A1* | 1/2010 | Leahy et al. | 726/7 |

OTHER PUBLICATIONS

Japanese language office action dated Aug. 17, 2010 and its English language translation for corresponding Japanese application 2005285203.

Japanese language office action dated Mar. 15, 2011 and its English language translation for corresponding Japanese application 2005285203 cites the foreign patent document above.

* cited by examiner

INFORMATION COMMUNICATION APPARATUS

CROSS-REFERENCE TO THE RELATED APPLICATIONS

This application is a national stage of international application No. PCT/JP2006/319066 filed on Sep. 26, 2006, which also claims benefit of priority under 35 U.S.C. §119 to Japanese Patent Application No. 2005-285203 filed on Sep. 29, 2005, the entire contents of which are incorporated by reference.

TECHNICAL FIELD

The present invention relate to an information communication apparatus for transmission/reception of information via a network and a program of the same, more particularly relates to an information communication apparatus for reliably transmitting information to an intended address.

BACKGROUND ART

In recent years, e-mails etc. sometimes induce users to input their bank account numbers or passwords etc. on fake websites created just like the real things. At the present, many of these are for the time of use of personal computers, but for example, as shown in Patent Document 1, systems using mobile phones for settling charges on the Internet are being actively studied.

Patent Document 1: Japanese Patent Publication (A) No. 2004-62771

DISCLOSURE OF THE INVENTION

Problems to be Solved by the Invention

Mobile phones have smaller screens and are more poor in amounts of information in comparison with personal computers, therefore mostly do not allow easily confirmation as to if websites displayed on their screens are legal ones.

FIG. 1 is a diagram showing examples of display of a URL (Uniform Resource Locater) address of the Internet in a mobile phone.

Figure 1A:
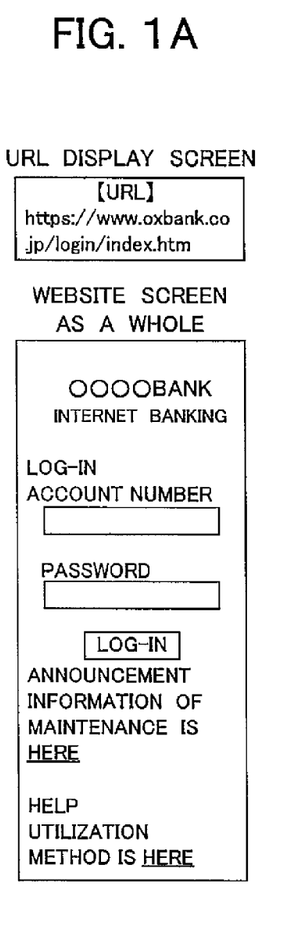
FIG. 1 A diagram showing examples of display of a URL address of the Internet in a mobile phone.

In the example of display shown in FIG. 1A, the URL address is displayed on a dedicated screen different from that for the web page. In order to display this dedicated screen, some key operations must be carried out, so the confirmation of the URL address is troublesome.

Figure 1B:
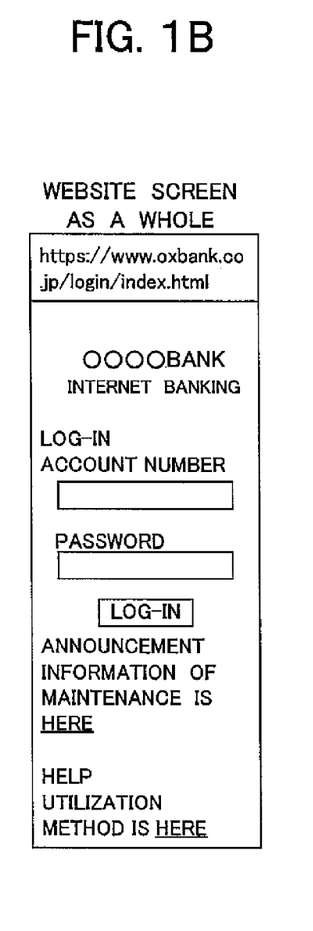

In the example of display shown in FIG. 1B, the URL address is displayed at a header of the web page. In this case, it is necessary to scroll the page up to the display portion of the URL address. Therefore, in a case where the web page is particularly long, the confirmation of the URL address is very troublesome.

Figure 1C:
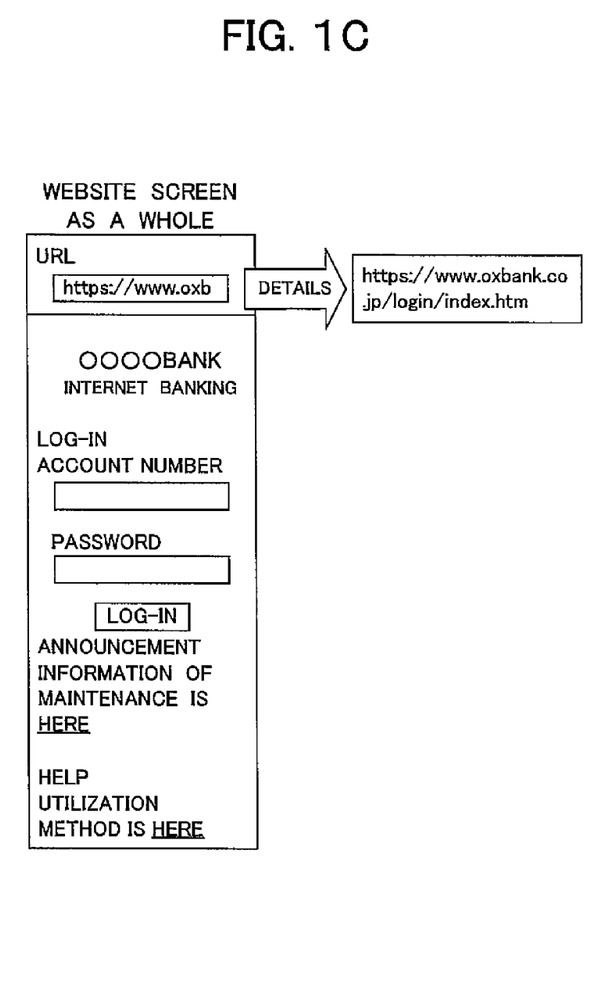

In the example of display shown in FIG. 1C, only a portion of the URL address is always displayed, but the detailed address is omitted. In order to display the whole URL address, some key operations must be carried out, so the confirmation of a correct URL address is troublesome.

In this way, in the mobile phone, information must be packed into a small screen. Therefore, in comparison with a personal computer or other apparatus provided with a relatively large screen, the confirmation of the URL address is troublesome. For this reason, there is a possibility that the confirmation of the URL address will become lax. Further, even if the user confirms of the URL address by viewing it by his/her naked eye, there is a possibility of occurrence of mistake in a case where the letter sequence is very long and a case where the displayed letters are very small.

In this way, in the method of the user confirming the URL address on the screen, there is a possibility that the user be lax in the confirmation of the URL address or make mistake. Therefore, in the case where a website is falsified to look just like a real site, there is a possibility that the user will transmit important information without becoming suspicious.

The present invention was made in consideration with such circumstances and has as an object thereof to provide an information communication apparatus for reliably transmitting information to a target site (URL address) and a program of the same.

Means for Solving the Problem

To attain the above object, an information communication apparatus according to a first aspect of the present invention includes a communicating means (101) for transmitting/receiving information via a network, a storing means (106) for storing a list (107) in which an address on the network and the information transmitted directed to the address are connected, an inputting means (102) enabling input of information to be transmitted from the communicating means (101), a warning means (105) for issuing a warning concerning information transmission from the communicating means (101), and a controlling means (110) for judging, before transmitting the information input from the inputting means (102) from the communicating means (101), if the input information matches with the information included in the list (107) and if the address related to the matching information in the list (107) differs from the address of a transmission destination of the input information and issuing the warning from the warning means (105) in accordance with the judgment result.

When the input information from the inputting means (102) matches with the information included in the list and the address connected with the matching information in the list (107) differs from the address of the transmission destination of the input information, the controlling means (110) may prohibit any subsequent information transmission to the transmission destination address.

When a warning is issued from the warning means (105), the controlling means (110) may prohibit or permit the information transmission from the communicating means (101) in response to an instruction input from the inputting means (102).

When the input information from the inputting means (102) matches with the information included in the list (107) and the address connected with the matching information in the list (107) is different from the address of the transmission destination of the input information, the controlling means (110) may display the difference of the two addresses in the warning means (105).

When the information input from the inputting means (102) does not match with the information included in the list (107), the controlling means (110) may register the input information and the address of the transmission destination of the input information in the list (107).

The controlling means (110) judges whether or not the information input to the inputting means (102) is predetermined confidential information. When judging that the input information is predetermined confidential information, the controlling means may request re-input of the information in a case where the address matching with the address of the transmission destination of the input information is registered in the list (107) and the information registered corresponding to the address does not match with the input information, while prohibit the transmission of the information to the other party of the communication in a case where the re-input reaches a predetermined number of times.

A program according to a second aspect of the present invention is a program run in an information communication apparatus including a communicating means (101) for transmitting/receiving information via a network, an inputting means (102) enabling input of the information to be transmitted from the communicating means (101), and a storing means (106), having a first routine of storing, in the storing means (106), a list (107) wherein an address on the network and the information transmitted directed to the address are connected, a second routine of judging, before transmitting the information input from the inputting means (102) from the communicating means (101), if the input information matches with the information included in the list (107) and if the address connected with the matching information in the list (107) differs from the address of the transmission destination of the input information, and a third routine of issuing a warning from the warning means (105) provided in the information communication apparatus in accordance with the judgment result of the second routine.

Effect of the Invention

According to the present invention, by issuing a warning when a user is about to transmit information to an address different from an address registered in a list in advance, information can be reliably transmitted to the object site (address).

EXPLANATION OF NOTATIONS

101—communication portion, 102—key input portion, 103—audio processing portion, 104—speaker, 105—display portion, 106—storage portion, 107—access list, and 108—program.

BEST MODE FOR CARRYING OUT THE INVENTION

Figure 2:
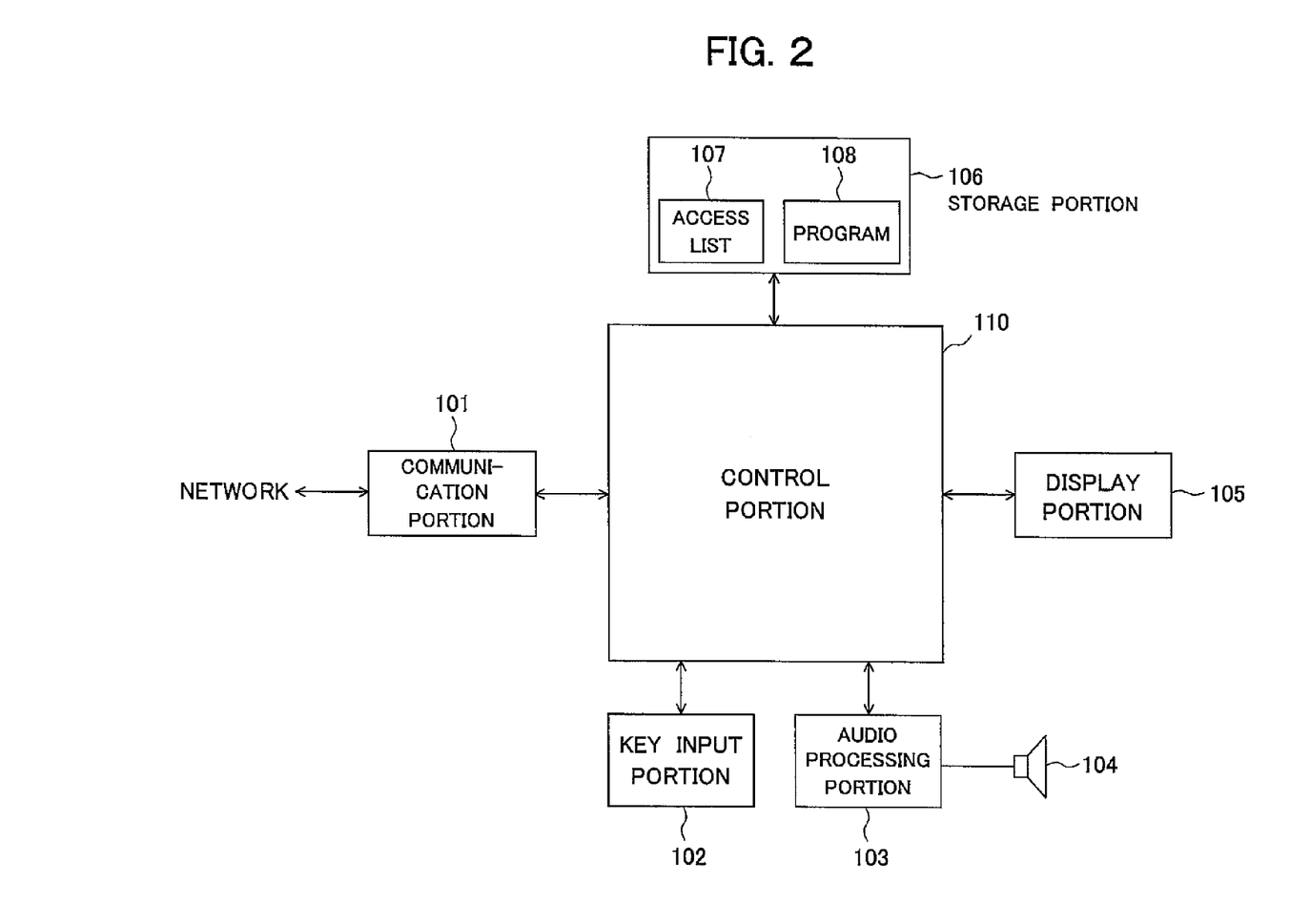
FIG. 2 A diagram showing an example of the configuration of an information communication apparatus according to an embodiment of the present invention.

FIG. 2 is a diagram showing an example of the configuration of an information communication apparatus according to an embodiment of the present invention. The information communication apparatus shown in FIG. 2 has communication portion 101, key input portion 102, audio processing portion 103, speaker 104, display portion 105, storage portion 106, and control portion 110.

The communication portion 101 is a unit for transmitting/receiving information via a network and is configured by for example a wireless communication device accessing the communication network of a mobile phone or by a modem, wireless LAN, or other network card. In the following explanation, it is assumed that the information communication via the Internet is carried out.

The key input portion 102 has for example number keys, letter keys, arrow keys, an enter key, or other keys having various functions. When these keys are operated by the user, a signal corresponding to the operation is generated. The signal is input as the input information to the control portion 110.

The audio processing portion 103 performs processing on an audio signal to be output at the speaker 104. Namely, the audio processing portion applies decoding, digital-analog conversion, amplification, or other signal processing to the audio data supplied from the control portion 110, converts this to an analog audio signal, and outputs the analog audio signal to the speaker 104.

The speaker 104 converts the audio signal supplied from the audio processing portion 103 to sounds and outputs the sounds.

The display portion 105 is configured by using for example a liquid crystal display panel, organic EL panel, or other display device and displays an image in accordance with image data supplied from the control portion 110. For example, the display portion reproduces the screen of the web page received via the communication portion 101 and displays the screen of the web page. Further, according to the control of the control portion 110, the display portion displays a warning screen etc. concerned with the information transmission to the Internet.

Figure 3:
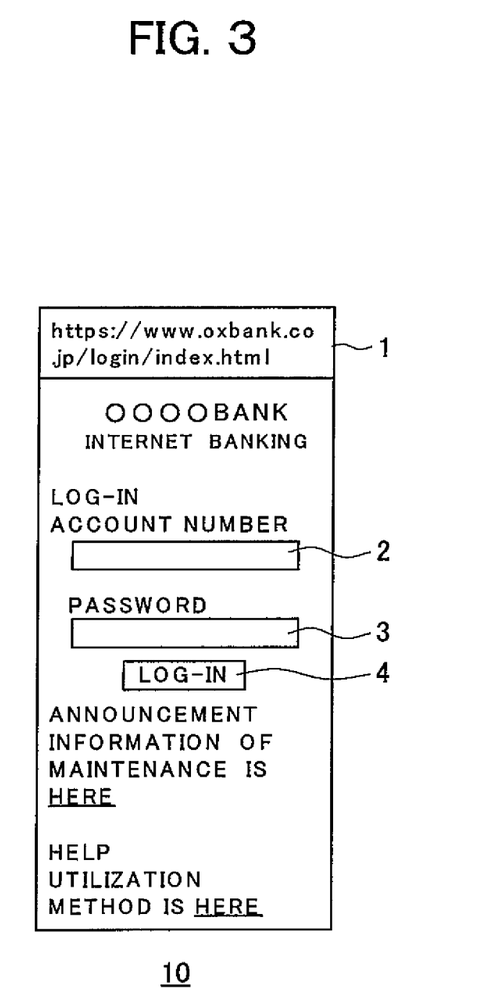
FIG. 3 A diagram showing an example of a screen of a web page displayed in a display portion.
Figure 6:
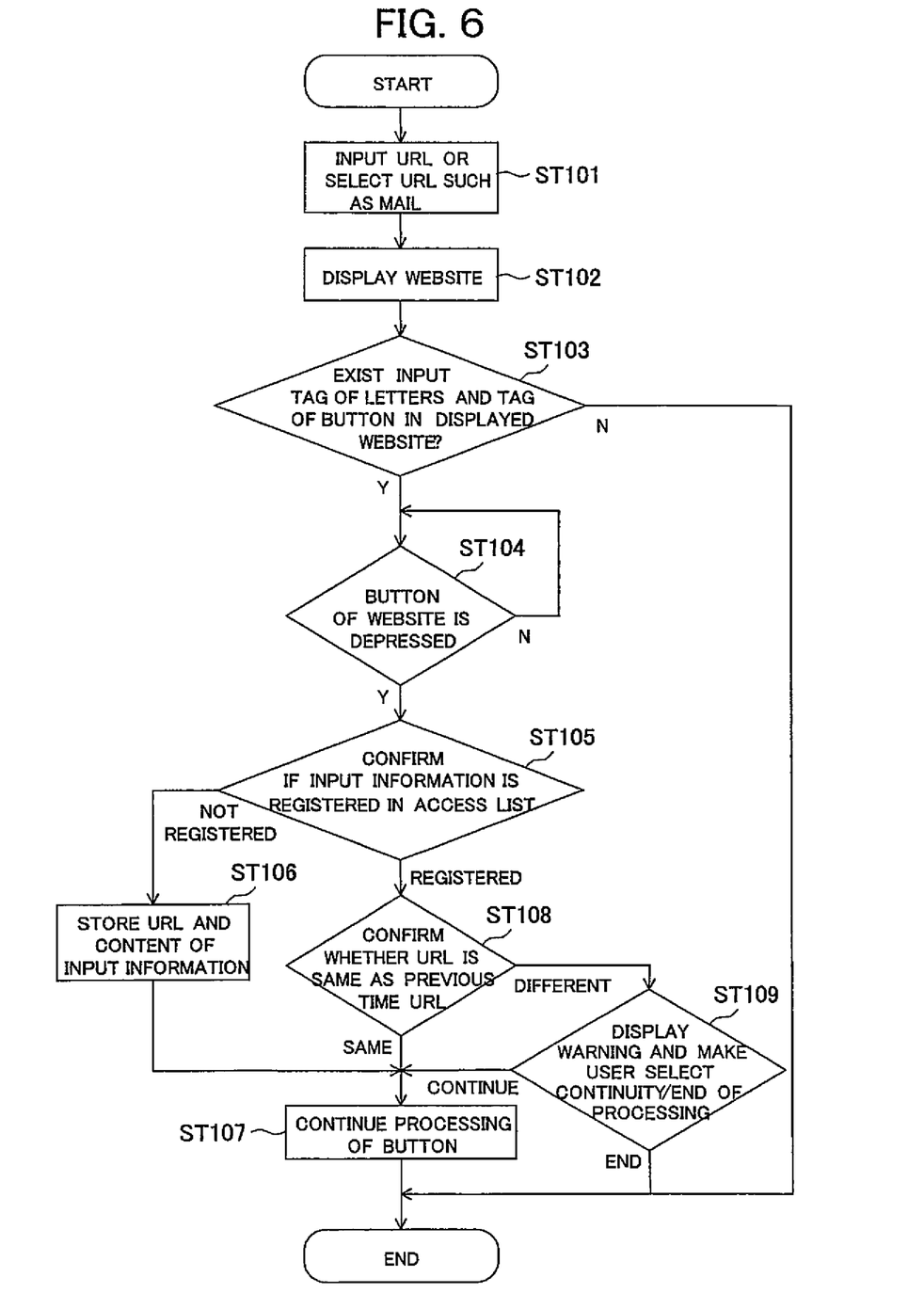
FIG. 6 A first flow chart showing an example of an operation at the time of information transmission in the information communication apparatus according to the present embodiment.
Figure 7:
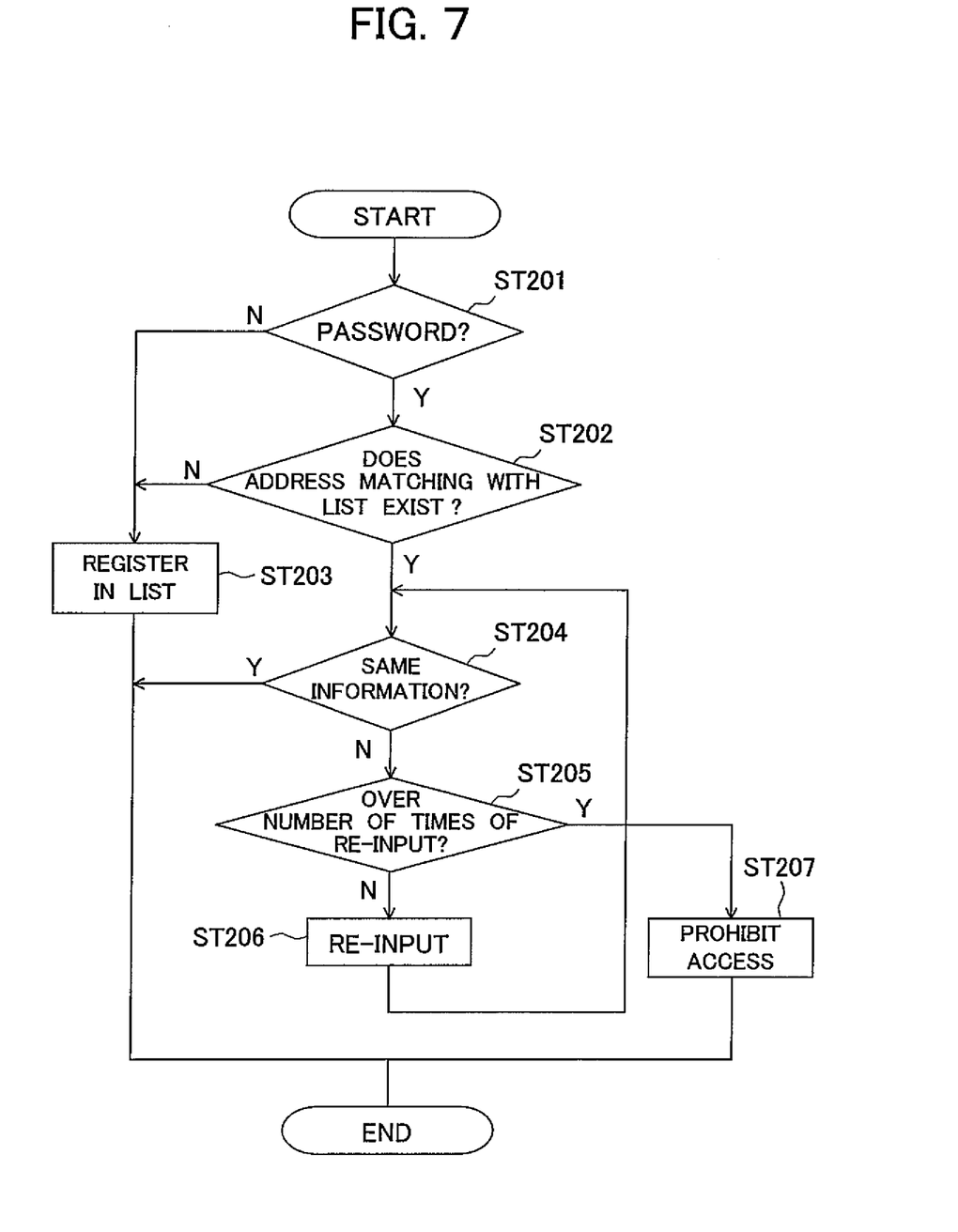
FIG. 7 A second flow chart showing an example of the operation at the time of information transmission in the information communication apparatus according to the present embodiment.

FIG. 3 is a diagram showing an example of a web page 10 displayed in the display portion 105. FIG. 3 shows an example of a web page for performing bank transactions over the Internet (Internet banking). In an uppermost portion of the web page 10, a display area 1 of the URL address of this web page is provided. Near the center of the web page 10, an input field 2 of the bank account number and an input field 3 of a password for starting the Internet banking are provided. A log-in button 4 is provided at the lower side of the input fields 2 and 3. When the button 4 is depressed in a state where the predetermined information are input to these input fields 2 and 3, it becomes possible to shift to the web page dedicated to Internet banking in a case where the processing explained later permits the transmission of the input information (FIG. 6 and FIG. 7).

The storage portion 106 stores various types of data utilized in the processing of the control portion 110 and data as a result of processing of the control portion 110. For example, the storage portion stores a code 108 of the computer program of the control portion 110, constant data used for that processing, variable data temporarily stored in the processing step etc. Further, the storage portion 106 stores an access list 107 wherein the URL address of the Internet site and the information transmitted directed to this URL address are linked.

Figure 4:
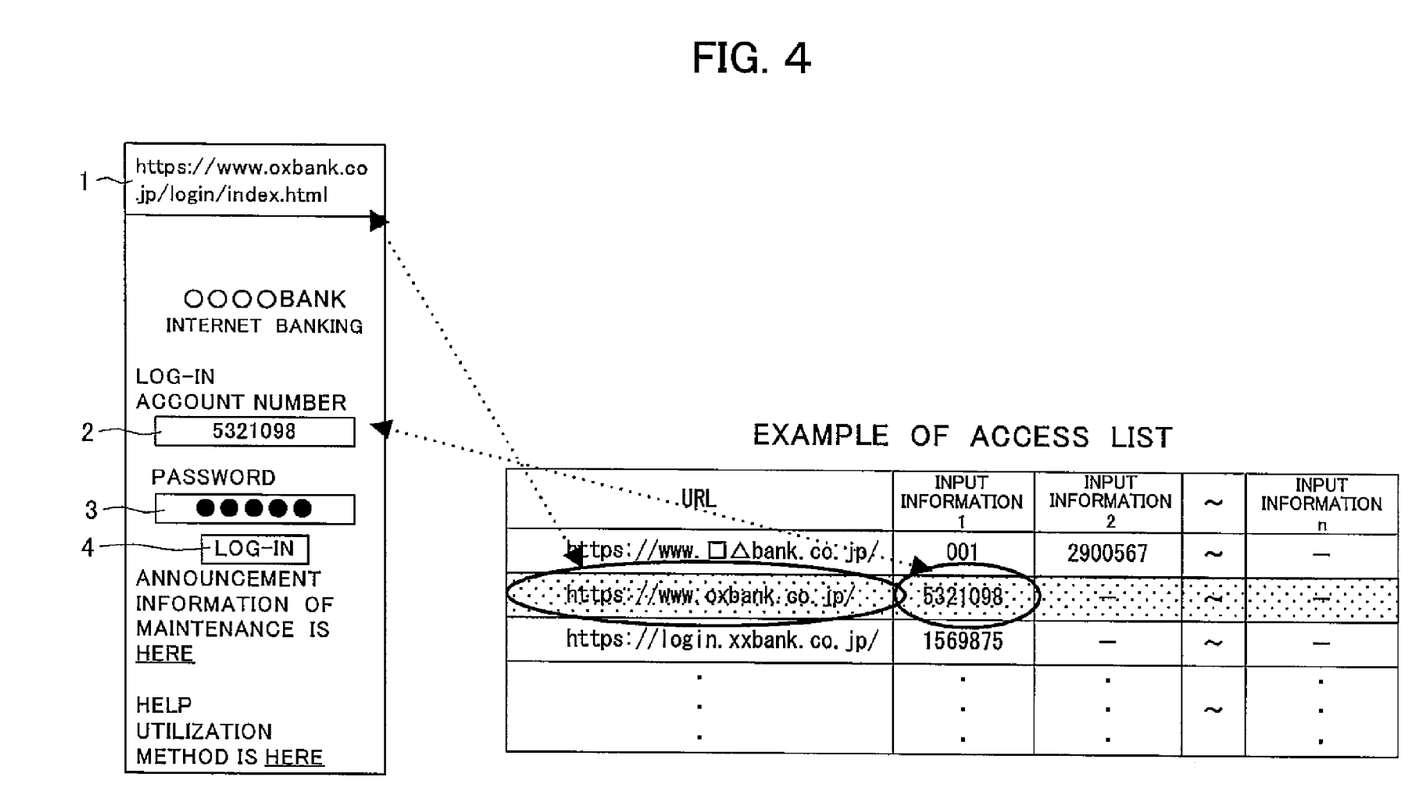
FIG. 4 A diagram showing an example of the configuration of an access list.

FIG. 4 is a diagram showing an example of the configuration of the access list 107. In the access list 107, for example as shown in FIG. 4, the URL addresses of web pages (sites) which have been accessed in the communication portion 101 and a maximum of n pieces of information which have been input from the key input portion 102 at those web pages and transmitted from the communication portion 101 are registered.

The storage portion 106 can be configured by using for example an SRAM or DRAM or other RAM, a flash memory or other nonvolatile memory, a hard disc, magneto-optical disc, or other various memory devices.

The control portion 110 executes the processing based on for example a program 108 (operating system, application, etc.) stored in the storage portion 106 to centrally control the overall operation of the apparatus. Namely, the control portion 110 controls these units so that the communication operation of the communication portion 101 based on a predetermined protocol, the display of the image in the display portion 105, and the generation of the audio signal in the audio processing portion 103 are executed in a suitable sequence according to the instruction of the user input to the key input portion 102.

Further, before transmitting the information input from the key input portion 102 from the communication portion 102, the control portion 110 judges whether or not this input information matches with the information included in the access list 107. When they match, the control portion 110 further judges if the address connected with the information matching with this input information in the access list 107 is different from the address of the transmission destination of the input information. As a result of this judgment, when the address registered in the access list 107 and the address of the transmission destination of the input information differ, there is a possibility that the user is going to transmit the information to an erroneous website, therefore the control portion 110 displays the warning screen in the display portion 105 to issue a warning to the user.

For example, in a case where the information input from the key input portion 102 matches with the information included in the access list 107 and where the address connected with the information matching with this input information in the access list 107 differs from the address of the transmission destination of the input information, the control portion 110 displays the difference of these two addresses as the warning screen explained later. Further, when displaying the warning screen in the display portion 105, the control portion 110 prohibits or permits the information transmission from the communication portion 101 in response to the instruction of the user input from the key input portion 102.

Figure 5:
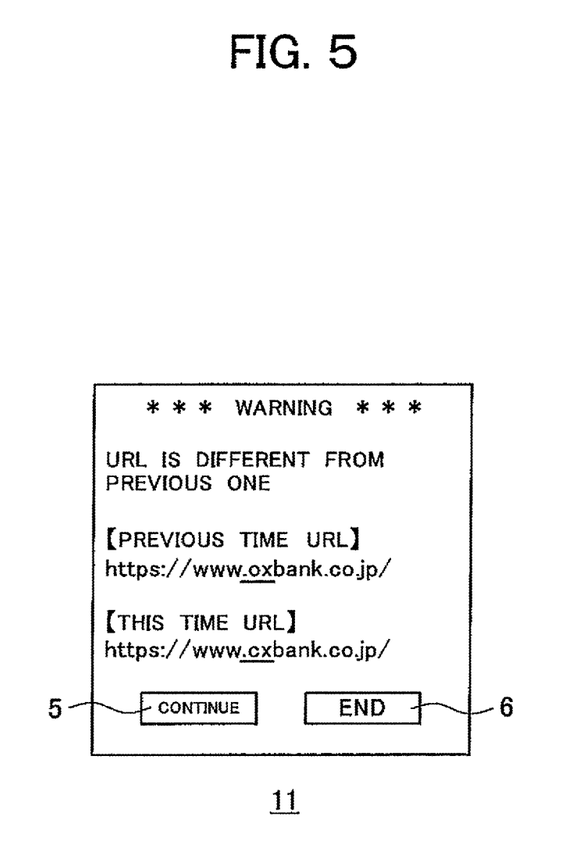
FIG. 5 A diagram showing an example of a warning screen displayed in the display portion.

FIG. 5 is a diagram showing an example of the warning screen displayed in the display portion 105. In the example of FIG. 5, the URL address of the transmission destination of the information input this time from the key input portion 102 and the URL address at the time when the information the same as this input information was transmitted the previous time are displayed aligned vertically. The latter URL address is the one registered in the access list 107 and linked with the same information as the input information this time in the access list 107. Portions different in these two URL addresses are for example underlined as shown in FIG. 5 and displayed so that the user can understand the difference at a glance.

In the lower portion of the warning screen shown in the example of FIG. 5, buttons 5 and 6 for selecting to continue or end the transmission of the input information are provided. When the button 5 marked "CONTINUE" is depressed, the control portion 110 permits the transmission of the input information and transmits the information to the corresponding URL address from the communication portion 101. On the other hand, where the button 6 marked "END" is depressed, the control portion 110 prohibits the transmission of the input information and does not transmit the information from the communication portion 101.

Further, when the information input from the key input portion 102 does not match with the information included in the access list 107, the control portion 110 registers this input information and the address of the transmission destination of the input information in the access list 107. Due to this, whenever the information is transmitted from the communication portion 102 to the network, the history thereof is recorded in the access list 107.

Further, the control portion 110 judges if the information input to the key input portion 102 in response to the request of the other party of communications is predetermined confidential information (password etc.) based on the request of the other party of this communications. For example, hyper text of the web page can be used to compose an input form for a viewer of the web page to transmit information to the website as in the input fields 5 and 6 shown in FIG. 5. This input form is realized by a programming element referred to as an "input tag" in the hyper text. An attribute is given to the input tag. Based on this attribute, it can be judged what type of information the Website is requesting the input of from the viewer. For example, when the input tag has a password attribute, it can be judged that the information that the website requests the input for is a password. The control portion 110 judges if the input information is the predetermined confidential information based on for example the attribute of this input tag.

When judging that the input information is confidential information, the control portion 110 searches for an address matching with the address of the transmission destination of the input information from the access list 107. When the matching address is found, the control portion 110 judges next whether the information connected with this address matches with the input information. When they do not match as a result of the judgment, there is a possibility that the user is inputting erroneous information, therefore the control portion 110 prompts the user to re-input the information. In a case where the judgment of no match is repeated irrespective of the re-input and the number of times of the re-inputs reaches a predetermined number of times, the control portion 110 prohibits the information transmission to this transmission destination address. Due to this, erroneous transmission of confidential information registered in the access list 107 is prevented.

Here, the operation at the time of the information transmission in the information communication apparatus shown in FIG. 2 having the above configuration will be explained with reference to the flow charts of FIG. 6 and FIG. 7.

First, when the URL address is input at the key input portion 102 or the URL address included in an e-mail etc. is selected, the control portion 110 performs processing accessing the website designated by this URL address (step ST101).

When the website indicated by the URL address really exists, a server of that web server responds, and the hyper text of the web page is transmitted to the communication apparatus. The control portion 110 of the information communication apparatus composes a screen of the web page based on the transmitted hyper text and displays this in the display portion 105 (ST102).

The control portion 110 judges if an input form requesting the input of the information is included in the displayed web page. For example, when one or more input tags and buttons exist in the hyper text of the web page, it judges that the input form is comprised on the web page (step ST103).

When judging that the input form is comprised on the web page, the control portion 110 monitors if information is input to the input form and a button is depressed during the period where the web page is displayed (step ST104). When a button is depressed, before transmitting the information which is input, the control portion 110 judges whether that information is registered in the access list 107 (step ST105). When new information which is not registered in the access list 107 is input, the control portion 110 shifts the processing to step ST106 explained later (FIG. 7).

When the input information is registered in the access list 107, the control portion 110 judges whether or not the address to which the input is transmitted (the URL address of the web page during display at present) and the URL address connected with the information matching with the input information in the access list 107 match (step ST108).

When the compared two addresses match, the control portion 110 permits the transmission of the input information and continues the processing after the button is depressed (step ST107). On the other hand, when the compared two address do not match, the control portion 110 displays for example a warning screen as shown in FIG. 5 in the display portion 105 and inquires to the user whether the transmission processing of the input information is to be continued or suspended (step ST109).

When the user who viewed this warning screen depresses the button for indicating the continuation of the transmission processing (the button 5 in the example of FIG. 5), the control portion 110 permits the transmission of the input information and continues the processing after the button is depressed (step ST107). When the user depresses the button indicating the end of the transmission processing (the button 6 in the example of FIG. 5), the control portion 110 prohibits the transmission of the input information.

When it is judged at step ST105 that the input information is not registered in the access list 107, the control portion 110 judges if this input information is the password (step ST201). For example, the control portion 110 judges whether the attribute of the input tag composing the input form on the web page is a predetermined password attribute. When this is not a password, the control portion 110 registers the input information and the URL address of the transmission destination of the input information in the access list 107 (step ST203).

When the input information is the password, the control portion 110 judges if the transmission destination address of the input information is registered in the access list 107 (step ST202). When this is not registered in the list, the control portion 110 registers the input information and the URL address of the transmission destination of the input information in the access list 107 (step ST203).

When the input information is the password and the transmission destination address of the input information is registered in the access list 107, the control portion 110 judges whether the information connected with the address registered in the access list 107 matches with the input information (step ST204). When the two match, the control portion 110 goes through loop processing explained next (ST204 to ST206) and shifts the processing to step ST107.

In the loop processing of steps ST204 to ST206, until information equal to the information previously transmitted to the URL address of the web page currently displayed (registered in the access list 107) is input, the processing repeating the input of information from the key input portion 102 is carried out. Namely, when it is judged in the judgment at step ST204 that the two information do not match, the control portion 110 judges if the number of times of re-input of the information has reached a predetermined number of times (step ST205). When it has not reached the predetermined number of times, the control portion 110 inputs the information again from the key input portion 102 (step ST206). For example, the control portion displays a message for promoting the re-input of the information in the display portion 105 and waits for the information input from the key input portion 102. When the information is input, the control portion 110 returns to step S204 again where repeats the processing explained above.

When it is judged at step ST205 that the number of times of re-input of the information reaches the predetermined number of times, the control portion 110 prohibits the transmission of the information to the URL address of the web page currently displayed (step ST207).

For example, the control portion 110 registers flag data (transmission prohibition flag) indicating the prohibition of the information transmission in connection with the corresponding address of the access list 107. When a transmission event of the input information is detected at step ST104, the control portion 110 confirms if the address of the transmission destination of the input information is given the transmission prohibition flag in the access list 107. When the flag is attached, it suspends the transmission of the information.

As explained above, according to the present embodiment, before transmitting the information input from the key input portion 102 from the communication portion 101, it is judged based on the registered content of the access list 107 whether or not the transmission of this input information is permitted. When this input information matches with the information included in the access list 107 and the URL address connected with the information matching with the input information in the access list 107 differs from the address of the transmission destination of the input information, a warning screen is displayed in the display portion 105.

Due to this, when the information transmission to the erroneous web page is going to be carried out, the fact that the URL address is the address different from the registered content of the access list 107 can be warned to the user in advance, therefore such information transmission can be prevented before occurrence. Accordingly, in comparison with the method of confirming the URL address by the user viewing it by the naked eye, the information can be more reliably transmitted to the legitimate website.

Further, a troublesome process of confirming the URL address by viewing by the naked eye is eliminated, so user friendliness can be improved.

Further, according to the present embodiment, in the case where the information input from the key input portion 102 does not match with the information included in the access list 107, this input information and the address of the transmission destination of the input information are registered in the access list 107. Due to this, it can be judged if the information transmission to the erroneous website is going to be carried out based on the history of transmissions performed in the past, therefore the transmission of information to the legitimate site can be more reliably carried out.

In addition, according to the present embodiment, in a case where the information which was input is a password or other predetermined confidential information and the legitimate information is registered in the access list 107, the input information and the legitimate information are compared. When the two do not match, the re-input of the information is carried out. Then, when the number of times of re-input reaches the predetermined number, subsequent information transmission to the URL address to which the user was going to transmit the information is prohibited.

In the present embodiment, before performing the information transmission, it is confirmed if that information matches with the registered content of the access list 107 and the warning is issued. Therefore, when the input of information is repeated many times and presence/absence of the warning is checked, there is a possibility of estimation of what type of information is registered in the access list 107. Therefore, by restricting the number of times of re-input as explained above, the estimation of the password or other confidential information to be registered in the access list 107 can be effectively prevented.

An explanation was given above of an embodiment of the present invention, but the present invention is not limited to only the above embodiment, but includes various modifications.

In the above embodiment, the attention of the user is drawn by displaying the warning screen in the display portion 105, but the present invention is not limited to this. For example, in order to further enhance the safety, subsequent information transmission to the warned address may be prohibited as well. Namely, when the input information from the key input portion 102 matches with the information included in the access list 107 and the address connected with this matching information in the access list 107 differs from the address of the transmission destination of the input information, the control portion 110 may prohibit the information transmission to the transmission destination address after that as well. Due to this, the possibility of transmission of important information to the erroneous site can be further lowered.

In the embodiment explained above, the attention of the user is drawn by displaying the warning screen in the display portion 105, but the present invention is not limited to this. The warning may be issued to the user by other various methods, for example, an alarm sound issued from the speaker 104 or vibration generated by a vibration portion (not shown) configured by a piezo-electric element or the like.

As the program of the information communication apparatus according to the present embodiment, one written in the storage portion 106 in the apparatus as shown in FIG. 2 may be run or one written on a magneto-optical disc or other recording medium may be read by a reading device thereof and run as well. Alternatively, the program may be executed by download from a not shown server device on the network connected via the communication portion 101 as well.

The invention claimed is:

1. A portable information communication apparatus comprising:
    a portable communicating portion for communicating information via a network;
    an inputting portion configured to input input information in a plurality of entries,
    a storing portion for storing a list including an address connected to registered information;
    wherein the registered information includes a plurality of types of registered information connected to the address;
    a warning portion for issuing a warning; and
    a controlling portion for judging that the plurality of entries of the input information matches with the corresponding plurality of types of the registered information included in the list, wherein the judging is performed prior to transmission of the input information by the portable communication portion, wherein
    the controlling portion judges if the address connected to the matching registered information in the list matches the address of a transmission destination of the input information,
    the controlling portion issuing the warning from the warning portion in accordance with the judgment result, and
    when the plurality of entries of the input information matches with the corresponding plurality of types of the registered information included in the list and the address connected with the matching registered information in the list is different from the address of the transmission destination of the input information, a portable display portion highlights and displays the difference between the two addresses in the warning portion by displaying both of the two addresses simultaneously.

2. A portable information communication apparatus as set forth in claim 1, wherein when the plurality of entries of the input information matches with the corresponding plurality of types of information of the registered information included in the list and the address connected with the matching registered information in the list differs from the address of the transmission destination of the input information, the controlling portion prohibits any subsequent information transmission to the transmission destination address.

3. A portable information communication apparatus as set forth in claim 1, wherein when the warning is issued from the warning portion, the controlling portion prohibits or permits the information transmission from the communicating portion in response to an instruction input from the inputting portion.

4. A portable information communication apparatus as set forth in claim 1, wherein when the plurality of entries of the input information does not match with the corresponding registered information included in the list, the controlling portion registers the input information and the address of the transmission destination of the input information in the list.

5. A non-transitory computer readable medium comprising a program running in a portable information communication apparatus including a portable communicating portion for communicating information via a network, an inputting portion configured to input input information of a plurality of entries to be transmitted from the portable communicating portion to a transmission destination, a portable display portion and a storing portion, comprising
    storing, in the storing portion, a list including an address connected to registered information, wherein the registered information includes a plurality of types of registered information connected to the address,
    judging that the plurality of entries of the input information matches with the corresponding plurality of types of the registered information included in the list, wherein the judging is performed prior to transmission of the input information by the portable communication portion,
    judging if the address connected with said the matching information in the list differs from the transmission destination of the input information,
    issuing a warning from the warning portion in accordance with the judgment result, and
    highlighting and displaying in the portable display portion the difference between the two addresses in the warning portion by displaying both of the two addresses simultaneously when the plurality of entries of the input information matches with the corresponding plurality of types of information of the registered information included in the list and the address connected with the matching registered information in the list is different from the address of the transmission destination of the input information.

6. A portable information communication apparatus comprising:
    a portable communication portion for communicating information via a network;
    an inputting portion configured to input input information of a plurality of entries;

a storing portion for storing a list including an address and connected to registered information;

wherein the registered information includes a plurality of types of registered information connected to the address;

a warning portion for issuing a warning; and a controlling portion for judging that the address of a transmission destination of the plurality of entries of the input information matches with the address included in the list; wherein the controlling portion judges if the plurality of types of the registered information connected to the matching address in the list matches the corresponding plurality of entries of input information;

the controlling portion issues the warning from the warning portion in accordance with the judgment result; and when the plurality of entries of the input information matches with the corresponding plurality of types of the registered information included in the list and the address connected with the matching registered information in the list is different from the address of the transmission destination of the input information, a portable display portion highlights and displays the difference between the two addresses in the warning portion by displaying both of the two addresses simultaneously.

7. A non-transitory computer readable medium comprising a program running in a portable information communication apparatus including a portable communicating portion for communicating information via a network, an inputting portion configured to input input information of a plurality of entries to be transmitted from the portable communicating portion to be transmitted from the communicating portion to a transmission destination, a portable display portion and a storing portion, comprising:

storing, in the storing portion, a list including an address connected to registered information, and wherein the registered information includes a plurality of types of registered information connected to the address, judging that the address of a transmission destination of the plurality of entries of the input information matches with the address included in the list, judging by the controlling portion if the plurality of types of registered information related to the matching address in the list matches the corresponding plurality of entries of the input information;

issuing a warning from the warning portion in accordance with the judgment result, and highlighting and displaying in the portable display portion the difference between the two addresses in the warning portion by displaying both of the two addresses simultaneously when the plurality of entries of the input information matches with the corresponding plurality of types of the registered information included in the list and the address connected with the matching registered information in the list is different from the address of the transmission destination of the input information.

* * * * *